UNITED STATES PATENT OFFICE.

RUDOLPH BERENDES AND JÜRGEN CALLSEN, OF ELBERFELD, GERMANY, ASSIGNORS TO FARBENFABRIKEN VORM. FRIEDR. BAYER & CO., OF ELBERFELD, GERMANY, A CORPORATION OF GERMANY.

METHYLENE CITRYL OXYTOLUIC ACID.

No. 874,824. Specification of Letters Patent. Patented Dec. 24, 1907.

Application filed June 11, 1907. Serial No. 378,529.

*To all whom it may concern:*

Be it known that we, RUDOLPH BERENDES and JÜRGEN CALLSEN, doctors of philosophy, chemists, citizens of the German Empire, residing at Elberfeld, Kingdom of Prussia, Germany, have invented new and useful Improvements in Methylene Citryl Oxytoluic Acids, of which the following is a specification.

Our invention relates to the preparation of new pharmaceutical products which are chemically methylene citryl oxytoluic acids having probably the formula:

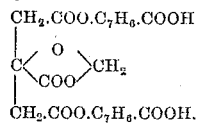

According to our researches these products possess valuable therapeutic properties and are suitable for use as medicines for rheumatism, an average dose being about one gram.

The process for producing our new compounds consists in treating oxytoluic acids (cresotinic acids) or their salts with the acid dichlorid of methylene citric acid having probably the formula:

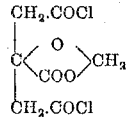

which can be produced by treating methylene citric acid with phosphorus pentachlorid.

The new products are crystalline compounds splitting off oxytoluic acid by heating them with caustic alkalies, being soluble in alcohol and acetone and scarcely soluble in water.

The new methylene citryl oxytoluic acids possess the property of forming salts with many metals, for example: the alkaline metals; the hydrogen of the carboxyl groups being replaced by the metal. In this manner either neutral or acid salts may be obtained. The new acids may also form salts with organic bases, such as: hexamethylentetramin. These salts represent the usual addition products of 1 molecule acid and 1 or 2 molecules of the base. All these salts have substantially the same therapeutic effect.

In order to illustrate our invention we give the following example, the parts being by weight:

Example: A solution of 241 parts of the acid dichlorid of methylene citric acid in about 300 parts benzene is slowly added to a solution of 304 parts of para-oxytoluic acid (OH:COOH:CH$_3$=1:2:4) and 370 parts of dimethylanilin in about 3000 parts benzene. The reaction begins at once with evolution of heat. The reaction mass is allowed to stand for some hours and is shaken with highly diluted hydrochloric acid about 3 per cent and then with water. After the benzene is distilled over the residue is crystallized from glacial acetic acid. Instead of dimethylanilin other bases capable of binding acids, such as quinolin, or the like, may be used.

The methylene citryl para-oxytoluic acid forms white crystals melting at from 175–178° centigrade. It is odorless and almost tasteless, easily soluble in alcohol and acetone, soluble in benzene and ether, and scarcely soluble in water. Para-oxytoluic acid is split off on heating the new product with caustic alkalies.

The process is carried out in an analogous manner on using other oxytoluic acids or their salts.

The methylene citryl meta-oxytoluic acid obtained from meta-oxytoluic acid

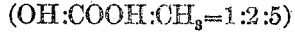

melts at 179° centigrade. The methylene citryl-ortho-oxytoluic acid obtained from ortho-oxytoluic acid

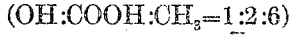

forms crystals melting at 170° centigrade. The methylene citryl oxy-ortho-toluic acid obtained from oxy-ortho-toluic acid

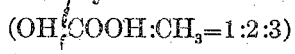

melts at from 170–175° centigrade.

Having now described our invention and in what manner the same is to be performed, what we claim as new and desire to secure by Letters Patent is:—

1. The herein-described new methylene citryl oxytoluic acids obtainable by the action of the acid dichlorid of methylene citric acid upon oxytoluic acids, which in the acid form are white crystalline powders, soluble in acetone and alcohol, scarcely soluble in water, and which by heating with caustic alkalies are decomposed into oxytoluic acids, forming salts with bases which retain the valuable therapeutic properties exhibited by the acids, substantially as hereinbefore described.

2. The herein-described new methylene citryl para-oxytoluic acid, obtainable by the action of the acid dichlorid of methylene citric acid upon para-oxytoluic acid, which in the acid form is a white crystalline powder, melting at from 175 to 178° C., soluble in alcohol, acetone, benzene and ether, scarcely soluble in water, and which by heating with caustic alkalies is decomposed into para-oxytoluic acid, forming salts with bases which retain the valuable therapeutic properties exhibited by the acid, substantially as hereinbefore described.

In testimony whereof we have hereunto set our hands in the presence of two subscribing witnesses.

RUDOLPH BERENDES. [L. S.]
JÜRGEN CALLSEN. [L. S.]

Witnesses:
 OTTO KÖNIG,
 HUGO BÖTTCHER.